US006809051B2

(12) United States Patent
Beall et al.

(10) Patent No.: US 6,809,051 B2
(45) Date of Patent: Oct. 26, 2004

(54) FABRICATION OF LOW THERMAL EXPANSION CALCIUM ALUMINATE ARTICLES

(75) Inventors: Douglas M. Beall, Painted Post, NY (US); Shahid G. Lakhwani, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 36 days.

(21) Appl. No.: 10/410,326

(22) Filed: Apr. 9, 2003

(65) Prior Publication Data

US 2003/0232713 A1 Dec. 18, 2003

Related U.S. Application Data

(63) Continuation-in-part of application No. 10/255,732, filed on Sep. 25, 2002, now abandoned.
(60) Provisional application No. 60/377,466, filed on May 1, 2002.

(51) Int. Cl.$^7$ ....................... C04B 35/057; C04B 35/10; B32B 3/12
(52) U.S. Cl. ....................... 501/125; 501/127; 502/439; 502/527.19; 428/116
(58) Field of Search ........................... 501/123, 124, 501/125, 127; 502/439, 527.19; 428/116

(56) References Cited

U.S. PATENT DOCUMENTS

| 3,312,558 | A | | 4/1967 | Miller, Jr. |
| 3,969,542 | A | | 7/1976 | Tomita et al. |
| 4,350,613 | A | | 9/1982 | Nishino et al. |
| 4,960,737 | A | | 10/1990 | Guile et al. |
| 6,686,305 | B1 | * | 2/2004 | Beall et al. ............. 501/124 |
| 6,689,707 | B1 | * | 2/2004 | Beall et al. ............. 501/123 |

FOREIGN PATENT DOCUMENTS

| DE | 243647 | * | 3/1987 |
| JP | 10-165817 | | 6/1998 |

OTHER PUBLICATIONS

E. R. Boyko et al., *The Optical Properties and Structures of CaO, $2Al_2O_3$, and $SrO.2Al_2O_3$*, Acta Cryst. 11, 444–445 (1958).
D. W. Goodwin et al, *The Crystal Structure of $CaO.2Al_2O_3$*, Acta Cryst. B26, 1230–1232 (1970).
V. I. Ponomarev et al., *Crystal Structure of Calcium Dialuminate, $CA_2$*, Soviet Physics–Crystallography 15, 995–998 (1971).
D. Weber et al., *The Occurrence of Grossite ($CaAl_4O-$) in Chandrites*, Geomchim. Cosmichim. Acta 58, 3855–3877 (1994).
E. Criado et al., *Calcium Hexaluminates as Refractory Material*, UNITECR Congress, Aachen, 403–407 (1991).
S. Jonas et al.., *A New Non–silicate Refractory of Low Thermal Expansion*, Ceramics International 24, 211–216 (1998).
S. Jonas et al., *Low Thermal Expansion Refractory Composites Based on $CaAl_4O$*, Ceramics International 25, 77–84 (1999).
Y. Suzuki et al., *In Situ Synthesis and Microstructure of Porous $CaAl_4O-/CaZrO_3$ Composite*, J. Ceram. Soc. Japan 109, 205–209 (2001).
R. D. Shannon et al., *Effective Ionic Radii in Oxides and Fluorides**, Acta Cryst. 925–946 (1969).

* cited by examiner

*Primary Examiner*—Karl Group
(74) *Attorney, Agent, or Firm*—Anca C. Gheorghiu; Scott S. Servilla

(57) ABSTRACT

Compositions, articles and methods for making such articles are disclosed. The compositions, articles and methods include calcium aluminate materials having a low coefficient of thermal expansion.

8 Claims, 1 Drawing Sheet

FABRICATION OF LOW THERMAL EXPANSION CALCIUM ALUMINATE ARTICLES

CROSS-REFERENCE TO RELATED APPLICATION

This application is a continuation-in-part of U.S. application Ser. No. 10/255,732, filed Sep. 25, 2002, now abandoned entitled "Fabrication of Low Thermal Expansion Calcium Aluminate Articles", by D. Beall et al. and additionally claims priority to U.S. Provisional Ser. No. 60/377,466, filed May 1, 2002.

FIELD OF THE INVENTION

This invention relates to calcium aluminate compositions, articles made from these compositions and methods of making such articles. More particularly, the invention relates to low thermal expansion calcium aluminate compositions and articles and methods of making low expansion articles.

BACKGROUND OF THE INVENTION

Low thermal expansion ceramic bodies are desirable in a wide variety of applications. For example, low expansion bodies have been used as filters for fluids, in particular, as diesel particulate filters and as substrates for catalytic converters, an example of which is known in the art as a honeycomb substrate. Additionally, low thermal expansion bodies are desirable in applications where the thermal shock resistance and the ultimate use temperature are high. Substrates used under conditions of high thermal gradients are examples of this application. For example, structures such as honeycomb and cellular substrates are subjected to harsh environments, which require high thermal shock resistance, low thermal expansion, and high mechanical shock properties. Maintaining these properties for extended periods of time in their intended environments eliminates many potentially useful refractory materials.

Cordierite substrates, typically in the form of a honeycomb body, have long been preferred for use as substrates to support catalytically active components for catalytic converters on automobiles, in part due to high thermal shock resistance of cordierite ceramics. The thermal shock resistance is inversely proportional to the coefficient of thermal expansion. That is, honeycombs with a low thermal expansion have a good thermal shock resistance and can survive the wide temperature fluctuations that are encountered in the application. Manufacturers work continuously to optimize the characteristics of cordierite substrates to enhance their utility as catalyst carriers. Specifically, manufacturers continually strive to optimize the thermal shock resistance and other properties of the cordierite substrates.

Another property of certain types of catalysts is the ability to purify exhaust gases and the ability to convert carbon monoxide, hydrocarbons and nitrogen oxides ($NO_x$) produced during engine operation into less environmentally harmful gases. Some catalyst systems utilize alkali metals contained on the catalyst support store nitrogen oxides, and such catalysts are referred to in the art as $NO_x$ adsorbers. A disadvantage of presently available catalyst and purification systems is that most of the alkali metals contained on the catalyst support for storing $NO_x$ readily react with cordierite within the temperature range of interest for $NO_x$ adsorber use. For example, potassium, a widely used alkali adsorber material, appears to readily react with cordierite, which draws the potassium out of the high surface area washcoat and prevents it from performing its adsorber function. Furthermore, the potassium reacts with cordierite to form relatively high coefficient of thermal expansion (CTE) phases that make the substrate and the catalyst system much less thermal shock resistant.

There is a need to provide alternative low CTE materials that are useful in high temperature applications. It would be desirable to provide materials that have a low CTE and excellent thermal shock resistance.

SUMMARY OF THE INVENTION

One embodiment of the invention relates to a ceramic article comprised of calcium aluminate including a main phase of $CaAl_4O_7$ and minor phase of $CaAl_2O_4$, and which exhibits a thermal expansion of less than about $25 \times 10^{-7}/°$ C. over the temperature range of about 25° C. to 800° C. Other embodiments relate to a calcium aluminate article having a thermal expansion less than about $20 \times 10^{-7}/°$ C. over the temperature range 25° C. to 800° C. Still other embodiments relate to a calcium aluminate article having a thermal expansion less than $15 \times 10^{-7}/°$ C. over the temperature range 25° C. to 800° C. Other embodiments relate to calcium aluminate articles having a thermal expansion less than about $10 \times 10^{-7}/°$ C. over the temperature range 25° C. to 800° C., and alternative embodiments relate to calcium aluminate articles having thermal expansions less than about $5 \times 10^{-7}/°$ C. over the temperature range 25° C. to 800° C. In certain embodiments, the articles contain a network of microcracks and include grains having a median grain size of between about 10 microns and 100 microns. The articles of the present invention can be used in a wide variety of applications, including but not limited to manufacturing honeycomb substrates for high temperature applications and honeycomb substrates for $NO_x$ adsorption applications.

Other embodiments of the invention relate to methods of manufacturing a calcium aluminate article which exhibits low thermal expansion. In one embodiment, the method includes mixing CaO and $Al_2O_3$ source powders, forming a shaped article from the powders and heating the article to a temperature exceeding about 1500° C. to form an article containing between 21.6% and 30% by weight CaO. In some embodiments, the article is fired to a temperature such that a network of microcracks and grains sized between 10 microns and 100 microns are present in the article after firing.

It is to be understood that both the foregoing general description and the following detailed description are exemplary and are intended to provide further explanation of the invention as claimed.

DETAILED DESCRIPTION

Figure 1:
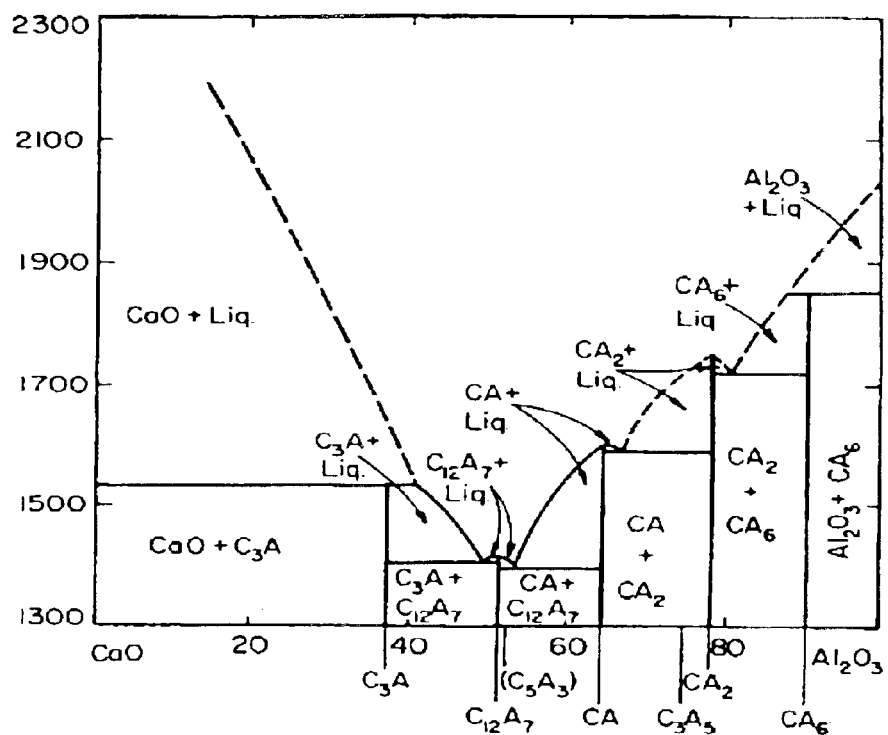
FIG. 1 is a phase diagram of $CaO-Al_2O_3$.

Before describing several exemplary embodiments of the invention, it is to be understood that the invention is not limited to the details of construction or process steps set forth in the following description. The invention is capable of other embodiments and of being practiced or carried out in various ways.

The various embodiments of the present invention provide materials, methods and articles having low coefficients of thermal expansion. It has been discovered that to achieve this low thermal expansion, varying the combination of raw materials and the firing schedule can be utilized to achieve the desired properties. By controlling the final stoichiometry of the fired article proper combinations of raw material types and the firing schedules utilized in the production of the ceramic articles, the thermal expansion of articles can be lowered.

The general method of producing the articles of the present invention includes mixing the appropriate batch materials, preferably materials having an average particle diameter of less than about 150 microns. In certain embodiments, the average particle diameter of the starting powders is less than about 50 microns, and in alternative embodiments, the average particle diameter is less than about 15 microns. The mixed powders are then blended and then formed by extrusion or other appropriate forming methods into a green article, for example, a honeycomb body. The article is then subsequently sintered to a hard porous structure. Various lubricants and organic binders such as methylcellulose are added to the batch during the mixing step to provide viscosity control and strength prior to firing and to provide porosity to the structure after firing. Porosity is also governed by the raw materials and the firing temperature. Higher firing temperatures result in lower porosity structures. In certain embodiments, the firing temperature is greater than about 1450° C., and in other embodiments, greater than about 1500° C. In other embodiments, the articles are fired to temperatures greater than about 1550° C., and in some embodiments, the articles are fired to at least about 1600° C. As will become evident in the examples below, the actual firing temperature will depend on the stoichiometry of the ceramic body.

Another embodiment of the present invention relates to calcium aluminate materials that have low thermal expansions which can be used in the manufacture of catalyst system supports. Calcium aluminate is a relatively inert refractory material that typically exhibits coefficients of thermal expansion in the range of about 40 to $60 \times 10^{-7}$/° C. over the temperature range of 25° C. to 800° C. Although in some applications, this range of thermal expansion is considered to be acceptable, this range is prohibitive in several applications because the thermal shock conditions and thermal stresses are too severe for articles in monolithic form.

Thus, a lower CTE is desirable to make monolithic articles more resistant to failure under certain thermal shock conditions. Applicants have surprisingly discovered that calcium aluminate articles can be manufactured that have much lower CTE values than typically exhibited by articles made from this material. Variation of the ratio of calcium oxide to aluminum oxide ratio and the firing temperature of the articles provides a calcium aluminate compound having surprisingly low CTE values. The new compounds were formed by mixing between about 21.6%–30% by weight source powders of CaO and the remainder aluminum oxide source powder formed into articles and fired to temperatures exceeding about 1500° C., and in certain embodiments, to temperatures preferably about 1600° C. However, the actual firing temperature will depend on the composition of the body. Examples of CaO source powders include calcium carbonate, calcium oxalate, calcium fluoride and calcium dihydroxide powders. Although calcium oxide can be used in its pure state, one skilled in the art will recognize that pure calcium oxide is highly reactive with water, and it is thus difficult to handle and store. If calcium carbonate is used as the source powder for calcium oxide, the weight of the powder used to obtain the proper weight percent of CaO must be adjusted upward by a factor of 1.785 to reflect the desired weight equivalent of CaO. According to certain embodiments of the invention, articles were produced that had CTEs as low as about $-1 \times 10^{-7}$/° C. over the temperature range of about 25° C. to 800° C.

According to one specific embodiment of the invention, substrates for catalysts systems for the purification of exhaust gases are provided, particularly for improved $NO_x$ adsorption efficiency. In certain embodiments, the substrates are resistant to alkali migration below 1000° C. and have a coefficient of thermal expansion less than about $25 \times 10^{-7}$/° C. over the temperature range of about 25° C. to 800° C. In some embodiments, the coefficient of thermal expansion is less than about $20 \times 10^{-7}$/° C. over the temperature range of about 25° C. to 800° C., and in certain embodiments, the CTE of the articles are less than about $15 \times 10^{-7}$/° C. over the temperature range of about 25° C. to 800° C. In other embodiments, the CTE is less than about $10 \times 10^{-7}$/° C. over the temperature range of about 25° C. to 800° C.

Without intending to limit the invention in any manner, the present invention will be more fully described by the following examples.

EXAMPLES

Inorganic powder batch mixes suitable for the formation of calcium aluminate ceramic bodies are shown in Table I and listed by weight percent. The inorganic compositions were formed by dry mixing calcium carbonate and alumina source powders having an average particle size between about 0.5 and 20 microns together with a cellulose ether binder, being either a methyl—cellulose or another cellulose ether derivative, in the range of 2–6% by weight of the inorganic components. Water is then added to the resulting batch in the range of 15–25% by weight of the inorganic components and the resulting batch is further mixed to form a plasticized ceramic batch mixture. All of the thus prepared batches were then extruded through a honeycomb die using a ram extruder to form a ceramic honeycomb structure. The formed honeycomb bodies were dried overnight and fired to temperatures ranging from about 1320° C. to 1600° C. to sinter the parts and form calcium aluminate honeycomb structures in the desired stoichiometry. The compositions fired to 1320° C. were held at the top temperature for about 24 hours, while all the other samples were held for about 8–24 hours. The compositions reported below are based on weight percent CaO and $Al_2O_3$, but using calcium carbonate as the source material for CaO.

Compositions containing about 50% and 40% CaO were not fired to temperatures higher than about 1320° C. because firing these compositions to higher temperatures would result in melting of the bodies. Compositions containing greater than about 21.6% CaO were not fired to temperatures higher than about 1600° C. because firing to higher temperatures would result in melting of the bodies.

TABLE I

| CaO (wt %) | Al$_2$O$_3$ (wt %) | CaAl$_4$O$_7$ (wt %) | 1320° C. | 1400° C. | 1450° C. | 1500° C. | 1550° C. | 1575° C. | 1600° C. |
|---|---|---|---|---|---|---|---|---|---|
| 50 | 50 | 0 | 47 | | | | | | |
| 40 | 60 | 0 | 41 | | | | | | |
| 32 | 68 | 25 | | 63 | | 65 | | | 50 |
| 29.2 | 70.8 | 45 | | | | 45 | 48 | 43.3 | |
| 27.8 | 72.2 | 55 | | | | 54 | 28.4 | 30.7 | |
| 26.4 | 73.6 | 65 | | | | 52.3 | 29.9 | 21.6 | |
| 25.0 | 75.0 | 75 | | | | 44.6 | 17.2 | 13.9 | |
| 24.8 | 75.2 | 77 | | 51.0 | | 53.0 | 16.3 | | |
| 23.7 | 76.3 | 85 | | | 24.7 | 12.2 | 5.6 | 1.9 | |
| 22.3 | 77.7 | 95 | | | 24.1 | 1.0 | -1.0 | -3.3 | |
| 21.6 | 78.4 | 100 | | | | | 51 | | 38 |
| 19 | 81 | 92 | | 52 | | 51 | | | 50 |
| 10 | 90 | 11 | | 71 | | 73 | | | 72 |
| 5 | 95 | 0 | | | | 73 | | | 78 |

Applicants determined that varying the particle size of the starting raw materials has a negligible impact on the final CTEs of the formed bodies for the compositions and firing temperatures tested. The results in the table indicate that calcium aluminate bodies having surprisingly low CTEs less than about $25 \times 10^{-7}$/° C. can be obtained with bodies containing between about 27.8 and 21.6 weight percent CaO. Bodies containing higher amounts of CaO required firing to higher temperatures to achieved low CTEs. The compositions in this range exhibited surprisingly low CTEs compared to the other examples and relative to typical CTEs published in the literature for calcium aluminate, which are typically $40 \times 10^{-7}$/° C. and higher over the temperature range of about 25° C. to 800° C. Accordingly, compositions having starting CaO contents of between about 20% and 30% by weight and between about 70% and 80% aluminum oxide content by weight and fired in excess of 1500° C. will exhibit low CTEs, that is, CTEs less than about $25 \times 10^{-7}$/° C. over the temperature range of about 25° C. to 800° C. These low CTE materials are of use in applications where thermal shock conditions may be encountered because lower CTE values result in improved thermal shock resistance for the material. These materials will be particularly suitable in the manufacture of catalyst substrates used in automotive applications.

While the present invention should not be limited by any particular theory, it is believed that a network of microcracks is formed on cooling after firing the novel calcium aluminate bodies described herein. The bodies having low CTEs are comprised of a major phase of CaAl$_4$O$_7$ (Grossite or calcium dialuminate or CA$_2$) and minor phase of CaAl$_2$O$_4$ (calcium monoaluminate or CA). The microcracks are thought to form as a result of thermal expansion anisotropy in the CaAl$_4$O$_7$ unit cell. This thermal expansion anisotropy creates areas of local mismatch stresses between grains of differing orientations, which if high enough, is able to create microfractures within the ceramic microstructure. The higher firing temperature presumably allows the grains to grow greater than the critical average size required for microcrack formation. It is believed that the network of microcracks is effective in decreasing the macroscopic thermal expansion coefficient, because on heating, the microcracks are healed. This healing of the microcracks is accomplished by accommodating positive thermal expansion of surrounding grains. Since the positive thermal expansion is used to heal the microcrack, the effect is to lower the overall thermal expansion of the polycrystalline sample. This reduction in observed thermal expansion coefficient continues until the cracks are sufficiently healed, whereupon the observed CTE returns to the average of the linear expansion in the three axes of the unit cell. On cooling, the process is reversed, and the cracks re-open again due to the fracture energy generated by locally misaligned neighboring grains.

Viewing the CaO—Al$_2$O$_3$ phase diagram (shown in FIG. 1), it can be seen that compositions falling within the CA+CA$_2$ phase field (containing about 64.5–78.4% Al$_2$O$_3$) result in the formation of some liquid when fired to temperatures approaching 1600° C. (or somewhat lower depending on levels of impurities). In the inventive compositions which fall within this range of alumina content, it is likely that liquid formation at high temperatures in firing results in some liquid-phase sintering. This liquid probably also supports the tremendous grain growth which is necessary to form the network of microcracks.

When compositions in the CA+CA$_2$ phase field are fired to high enough temperatures, a liquid phase is formed, and the stable phases are CA$_2$+liquid. The amount of liquid formed at a given temperature increases as the level of alumina in the base composition decreases as defined by the lever rule. Therefore, compositions falling in this phase field increase in alumina content up to almost 78.4%, the amount of liquid present above the solidus temperature decreases. It is believed that the smallest amount of liquid required to get sufficient grain growth would be preferred from a processing standpoint. This is because large volumes of liquid phase can result in significant distortion of the part and sticking to the setter on which the ceramic article is fired.

Therefore, to achieve a low coefficient of thermal expansion in compositions rich in CA$_2$, a body should contain a network of fine microcracks, which act to moderate bulk expansion as the cracks are healed during heating. Conversely, upon cooling, the cracks reversibly open again, resulting in a reduced thermal expansion as the opening of cracks serves to reduce the thermal expansion coefficient compared to a body where no cracks open upon cooling. It has also been observed in SEM micrographs of samples that a certain grain size of the CA$_2$ phase is required to generate enough fracture energy to create the microfractures in neighboring misaligned grains. This grain size is believed to be between about 10 and 100 μm.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A ceramic article comprised of calcium aluminate including a main phase of $CaAl_4O_7$ and minor phase of $CaAl_2O_4$, and which exhibits a thermal expansion of less than about $25 \times 10^{-7}/°$ C. over the temperature range 25° C. to 800° C.

2. The article of claim 1, wherein the article exhibits a thermal expansion of less than about $15 \times 10^{-7}/°$ C. over the temperature range of about 25° C. to 800° C.

3. The article of claim 1, wherein the article exhibits a thermal expansion of less than about $10 \times 10^{-7}/°$ C. over the temperature range of about 25° C. to 800° C.

4. The ceramic article of claim 1, wherein the article exhibits a thermal expansion of less than about $5 \times 10^{-7}/°$ C. over the temperature range of about 25° C. to 800° C.

5. The ceramic article of claim 1, wherein the article contains a network of microcracks.

6. The ceramic article of claim 5, wherein the article includes grains having an average grain size between about 10 microns and 100 microns.

7. The ceramic article of claim 1, wherein the article is in the form of a honeycomb substrate.

8. The ceramic article of claim 7, wherein the article is a catalyst for purification of exhaust gases.

* * * * *